(12) United States Patent
Vass et al.

(10) Patent No.: US 7,499,743 B2
(45) Date of Patent: Mar. 3, 2009

(54) METHOD AND SYSTEM FOR REGISTRATION OF 3D IMAGES WITHIN AN INTERVENTIONAL SYSTEM

(75) Inventors: Melissa Vass, Milwaukee, WI (US); Jasbir S. Sra, W. 305 N. 29263 Red Oak Ct., Pewaukee, WI (US) 53072; Darin R. Okerlund, Muskego, WI (US)

(73) Assignees: General Electric Company, Schenectady, NY (US); Jasbir S. Sra, Pewaukee, WI (US)

(*) Notice: Subject to any disclaimer, the term of this patent is extended or adjusted under 35 U.S.C. 154(b) by 553 days.

(21) Appl. No.: 10/905,169

(22) Filed: Dec. 20, 2004

(65) Prior Publication Data

US 2005/0197568 A1 Sep. 8, 2005

Related U.S. Application Data

(63) Continuation-in-part of application No. 10/063,064, filed on Mar. 15, 2002, now Pat. No. 7,286,866, and a continuation-in-part of application No. 10/065,595, filed on Nov. 1, 2002, now Pat. No. 7,346,381, and a continuation-in-part of application No. 10/249,815, filed on May 9, 2003, now Pat. No. 7,343,196.

(60) Provisional application No. 60/531,293, filed on Dec. 19, 2003, provisional application No. 60/531,294, filed on Dec. 19, 2003.

(51) Int. Cl.
*A61B 5/05* (2006.01)

(52) U.S. Cl. ............... 600/426; 600/407; 600/424; 600/414

(58) Field of Classification Search ............ 600/426, 600/414, 407, 424
See application file for complete search history.

(56) References Cited

U.S. PATENT DOCUMENTS 3,954,098 A 5/1976 Dick et al. ............ 128/2.05 Z (Continued)

FOREIGN PATENT DOCUMENTS

EP 1182619 A2 8/2001

(Continued)

OTHER PUBLICATIONS

Toshiko Nakai, Michael D. Lesh, Edward P. Gerstenfeld, Renu Virmani, Russell Jones and Randall J. Lee; "Percutaneous Left Atrial Appendage Occlusion (PLAATO) for Preventing Cardioembolism: First Experience in Canine Model", Circulation 2002; 105;2217-2222; originally published online Apr. 15, 2002; American Heart Association; http://circ.ahajounals.org/cgi/content/full/105/18/2217.

(Continued)

*Primary Examiner*—Brian L. Casler
*Assistant Examiner*—John F Ramirez
(74) *Attorney, Agent, or Firm*—Cantor Colburn LLP (57) ABSTRACT

A method for registration of cardiac image data in an interventional system includes inserting a first plurality of fiducial points on an acquired 3D anatomical image and exporting the 3D anatomical image, with the first plurality of inserted fiducial points thereon, to an interventional system. A second plurality of fiducial points is inserted on the exported 3D anatomical image using the interventional system, and the first and said second plurality of fiducial points are aligned to one another so as to register the exported 3D anatomical image with the interventional system.

10 Claims, 8 Drawing Sheets

U.S. PATENT DOCUMENTS

| | | | |
|---|---|---|---|
| 4,364,397 A | 12/1982 | Citron et al. | |
| 4,574,807 A | 3/1986 | Hewson et al. | 128/419 PG |
| 5,245,287 A | 9/1993 | Nowak et al. | 324/322 |
| 5,274,551 A | 12/1993 | Corby, Jr. | 364/413.13 |
| 5,304,212 A | 4/1994 | Czeisler et al. | 607/88 |
| 5,348,020 A | 9/1994 | Huston | 128/696 |
| 5,353,795 A | 10/1994 | Souza et al. | 128/653.2 |
| 5,391,199 A | 2/1995 | Ben-Haim | 607/122 |
| 5,431,688 A | 7/1995 | Freeman | 607/10 |
| 5,568,384 A | 10/1996 | Robb et al. | 364/419.13 |
| 5,738,096 A | 4/1998 | Ben-Haim | 128/653.1 |
| 5,752,522 A | 5/1998 | Murphy | 600/587 |
| 5,765,561 A | 6/1998 | Chen et al. | |
| 5,823,958 A | 10/1998 | Truppe | 600/426 |
| 5,839,440 A | 11/1998 | Liou et al. | 600/431 |
| 5,951,475 A | 9/1999 | Gueziec et al. | 600/425 |
| 6,081,577 A | 6/2000 | Webber | 378/23 |
| 6,154,516 A | 11/2000 | Heuscher et al. | 378/15 |
| 6,233,304 B1 | 5/2001 | Hu et al. | 378/8 |
| 6,235,038 B1 | 5/2001 | Hunter et al. | 606/130 |
| 6,246,898 B1 | 6/2001 | Vesely et al. | 600/424 |
| 6,249,693 B1 | 6/2001 | Cline et al. | 600/410 |
| 6,252,924 B1 | 6/2001 | Davantes et al. | 378/8 |
| 6,256,368 B1 | 7/2001 | Hsieh et al. | 378/8 |
| 6,266,553 B1 | 7/2001 | Fluhrer et al. | 600/428 |
| 6,289,115 B1 | 9/2001 | Takeo | 382/130 |
| 6,289,239 B1 | 9/2001 | Panescu et al. | 600/523 |
| 6,298,259 B1 | 10/2001 | Kucharczyk et al. | 600/411 |
| 6,314,310 B1 | 11/2001 | Ben-Haim et al. | 600/424 |
| 6,325,797 B1 | 12/2001 | Stewart et al. | 606/41 |
| 6,348,793 B1 | 2/2002 | Balloni et al. | 324/309 |
| 6,353,445 B1 | 3/2002 | Babula et al. | 345/733 |
| 6,381,485 B1 | 4/2002 | Hunter et al. | 600/407 |
| 6,389,104 B1 | 5/2002 | Bani-Hashemi et al. | 378/98.12 |
| 6,411,848 B2 | 6/2002 | Kramer et al. | 607/9 |
| 6,421,412 B1 | 7/2002 | Hsieh et al. | 378/9 |
| 6,456,867 B2 | 9/2002 | Reisfeld | 600/407 |
| 6,468,265 B1* | 10/2002 | Evans et al. | 606/1 |
| 6,490,475 B1 | 12/2002 | Seeley et al. | 600/426 |
| 6,490,479 B2 | 12/2002 | Bock | 600/518 |
| 6,549,606 B1 | 4/2003 | Vaillant et al. | 378/4 |
| 6,556,695 B1 | 4/2003 | Packer et al. | 382/128 |
| 6,584,343 B1 | 6/2003 | Ransbury et al. | 600/509 |
| 6,650,927 B1* | 11/2003 | Keidar | 600/424 |
| 6,782,284 B1 | 8/2004 | Subramanyan et al. | 600/407 |
| 6,950,689 B1* | 9/2005 | Willis et al. | 600/407 |
| 7,047,060 B1 | 5/2006 | Wu | |
| 2002/0010392 A1 | 1/2002 | Desai | 600/374 |
| 2002/0042570 A1 | 4/2002 | Schaldach et al. | |
| 2002/0046756 A1 | 4/2002 | Laizzo et al. | 128/899 |
| 2002/0138108 A1 | 9/2002 | Kralik | 607/9 |
| 2003/0018251 A1 | 1/2003 | Solomon | 600/427 |
| 2003/0023266 A1 | 1/2003 | Borillo et al. | 606/200 |
| 2003/0028183 A1 | 2/2003 | Sanchez et al. | 606/34 |
| 2003/0065260 A1 | 4/2003 | Cheng et al. | 600/427 |
| 2003/0097219 A1 | 5/2003 | O'Donnell et al. | 702/19 |
| 2003/0187358 A1 | 10/2003 | Okerlund et al. | 600/443 |
| 2003/0220557 A1* | 11/2003 | Cleary et al. | 600/409 |
| 2004/0087850 A1 | 5/2004 | Okerlund et al. | 600/407 |
| 2004/0225212 A1 | 11/2004 | Okerlund et al. | 600/407 |
| 2004/0225328 A1 | 11/2004 | Okerlund et al. | 607/9 |
| 2004/0225331 A1 | 11/2004 | Okerlund et al. | 607/14 |

FOREIGN PATENT DOCUMENTS

| | | |
|---|---|---|
| EP | 1321101 A2 | 12/2002 |
| WO | WO 91/07726 | 5/1991 |
| WO | WO 96/10949 | 4/1996 |

OTHER PUBLICATIONS

H. Nikagawa et al., "Role of the Tricuspid Annulus and the Eustachian Valve/Ridge on Atrial Flutter: Relevance to Catheter Ablation of the Septal Isthmus and a New Technique for Rapid Identification of Ablation Success;" *Circulation* 1996; 94:407-24.

L. Gepstein et al., "A Novel Method for Nonfluoroscopic Catheter-Based Electroanatomical Mapping of the Heart: In Vitro and In Vivo Accuracy Results;" *Circulation* 1997; 95:1611-22.

S. Shpun et al., "Guidance of Radiofrequency Endocardial Ablation with Real-time Three-dimensional Magnetic Navigation System;" *Circulation* 1997; 96:2016-21.

J. Sra et al., "Electroanatomic Mapping to Identify Breakthrough Sites in Recurrent Typical Human Flutter;" *Paceing Clin. Electrophysiol* 2000; 23:1479-92.

R.J. Schilling et al.; "Simultaneous Endocardial Mapping in the Human Left Ventricle Using a Noncontact Catheter: Comparison of Contact and Reconstructed Electrograms During Sinus Rhythm;" *Circulation* 1998; 98:997-98.

C. C. Gornick et al., "Validation of a New Noncontact Catheter System for Electroanatomic Mapping of Left Ventricular Endocardium;" *Circulation* 1999; 99:829-835.

J. Sra et al., "Noncontact Mapping for Radiofrequency Ablation of Complex Cardiac Arrhythmias;" *J. Interven. Cardiac Electrophysiol* 2001; 5:323-331.

N. M.S. de Groot et al., "Three-Dimensional Catheter Positioning During Radiofrequency Ablation in Patients: First Application of a Real-Time Position Management System;" *J. Interven. Cardiac Electrophysiol* 2001; Nov. 11(11):1183-92.

J. Schreieck et al., "Radiofrequency Ablation of Cardiac Arrhythmias Using a Three-Dimensional Real-Time Position Management and Mapping System;" *Pacing Clin. Ekectrophysiol*, Dec. 2002, 25(12): 1699-707.

F. Wittkampf et al., "Real-Time, Three-Dimensional, Nonfluoroscopic Localization of the Lasso Catheter;" *J. Interven. Cardiac Electrophysioll* 2002, 13:630.

J. Sra et al., "Cardiac Chamber Geometry Construction, Catheter Navication and Ablation Using Cutaneous Patches;" *Supplement to Circulation* Oct. 2003, 108 (17): IV-585, Abstract 2667.

J. Sra et al., "Three-Dimensional Right Atrial Geometry Construction and Catheter Tracking Using Cutaneous Patches;" *J. Interven. Cardiac Electrophysiol*, 2003 14:897.

Z. Zhang; "Iterative Point Matching for Registration of Free-Form Curves;" *Inria* 1992, pp. 1-40.

C.L. Grines et al.; "Functional Abnormalities in Isolated Left Bundle Branch Block: The Effect of Interventricular Asynchrony;" *Circulation*; 1989; 79:845-53.

H. B. Xia et al., "Differing effects of right ventricular pacing and left bundle branch block on left ventricular function;" *Br. Heart J.*, 1993; 69:166-173.

S. Cazeau et al., "Effects of Multisite Biventricular Pacing in Patients with Heart Failure and Intraventricular Conduction Delay;" *N. Engl. J. Med.* 2001; 344:873-880.

M.V. Pitzalis et al., "Cardiac Resynchronization Therapy Tailored by Echocardiographic Evaluation of Ventricular Acnchrony;" *J. Am. Coll. Cardiol.* 2002; 40:1615-22.

W. T. Abraham et al., "Cardiac Resynchronization in Chronic Heart Failure;" *N. Engl. J. Med.* 2002; 346:1845-1853.

C. A. Pelizzari et al., "Accurate Three-Dimensional Registration of CT, PET, and/or MR Images of the Brain;" *J. Comput. Assist. Tomogr.* 1989; 13:20-26.

A.C. Evans et al.; "MRI-PET Correlation in Three Dimensions Using a Volume-of-Interest (VOI) Atlas;" *J. Cerb Flow Metab.* 1991; 11:A69-A78.

R.P. Woods et al.; "Rapid Automated Algorithm for Aligning and Reslicing PET Images;" *Journal of Computer Assisted Tomography*, 1992; 16:620-633.

B.A. Ardekani et al.; "A Fully Automatic Multimodality Image Registration Algorithm;" *Journal of Computer Assisted Tomography*; 1995; 19:615-623.

L. Thurfell et al.; "Registration of Neuroimaging Data: Implementation and Clinical Applications;" *American Society of Neuroimaging*; 2000; 10:39-46.

S. A. Ben-Haim et al.; "Nonfluoroscopic, in vivo navigation and mapping technology;" *Nature Medicine*; 1996, 2:1393-5.

B. Taccardi et al.; "A new intracaitary probe for detecting the site of origin of ectopic ventricular beats during one cardiac cycle;" *Circulation*; 1987; 75:272-81.

F. H.M. Wittkampf et al.; "New Technique for Real-Time 3-Dimensional Localization of Regular Intracardiac Electrodes;" *Circulation*; 1999; 99:1312-17.

V. Fuster et al. "ACC/AHA/NASPE 2002 Guidelines Update for Implantation of Pacemakers and Antiarrhythmia Devices;"J. Am. Coll. Cardiol 2001; 38:1-47.

D. R. Ney "Volumetric Rendering of Computed Tomography Data: Principles and Techniques;" *IEEE Computer Graphics and Applications*; 1990; 24-32.

N. M. Alpert et al., "The Principal Axes Transformation—A Method for Image Registration;" *The Journal of Nuclear Medicine*; 1990; 31:1717-1722.

P.A. van den Elsen et al.; "Medical Image Matching—A Review with Classification;" *IEEE Engineering in Medicine and Biology*, 1993; 26-38.

G. T. Barnes et al.; "Conventional and Spiral Computed Tomography: Physical Principles and Image Quaility Considerations;" *Computed Body Tomography*, 1998, Lippincot-Raven, Philadelphia, PA pp. 1-20.

Milan Sonka and J. Michael Fitzpatrick (eds); *Handbook of Medical Imaging vol. 2. Medical Image Processing and Analysis*; pp. 129-174 & 447-506.

W. M. Feinberg et al.; "Prevalence, Age Distribution, and Gender of Patients with Atrial Fibrillation;" *Arch. Intern. Med. vol. 155*; Mar. 1995; pp. 469-473.

J. L. Cox, J. P. Boineau, R. B. Schuessler, T. B. Ferguson, Jr., M. E. Cain, B. D. Lindsay, P. B. Corr, K. M. Kater, D. G. Lappas; "Operations for Atrial Fibrillation;" Electrophysiology, Pacing and Arrhythmia, Clin. Cardiol. 14, 1991; pp. 827-834.

M. Haissaguerre, P. Jais, S. C. Shah, A. Takahashi, M. Hocini, G. Quiniou, S. Garrigue, A. Le Mouroux, P. Le Metayer, and J. Clementy; "Spontaneous Initiation of Atrial Fibrillation by Ectopic Beats Originating in the Pulmonary Viens;" The New England Journal of Medicine, vol. 339, No. 10, Sep. 3, 1998; pp. 659-668.

C. Pappone, S. Rosanio, G. Augello, G. Gallus, G. Vicedomini, P. Mazzone, S. Gulletta, F. Gugliotta, A. Pappone, V. Santinelli, V. Tortoriello, S. Sala, A. Zangrillo, G. Crescenzi, S. Benussi, and O. Alfieri; "Mortality, Morbidity, and the Quality of Life After Circumferential Pulmonary Vein Ablation for Atrial Fibrillation;" Journal of the American College of Cardiology, vol. 42, No. 2; 2003; 185-197.

J. Sra et al., "Current Problems in Cardiology—Atrial Fibrilliation: Epidemiology, Mechanisms, and Management;" Current Problems in Cardiology, Jul. 2000; pp. 406-524.

ACC/AHA/ESC Practise Guidelines; Eur. Heart J., vol. 22, issue 20, Oct. 2001; pp. 1854-1923.

M. D. Leash, T. Trepelse, H. Omran, A. Bartorelli, P. Della Bella, T. Nakai, M. Reisman, D. fleschenberb, U. Krumsdorf, and D. Scherer; "Tiny Device Blocks 'Useless' Part of Heart, prevents blood clots;" Journal Report; American Heart Association, Apr. 9, 2002.

Ellen Barlow; "Operating in 3-D" found at www.med.harvard.edu/publications/HMAB/196fo3d.html.

PCT Search Report for PCT/US2004/020909.

"Advanced Vessel Analysis" product descritpoin, [online] http://www.gehealthcare.com/usen/ct/clin_app/products/aswessel.html [retrieved Dec. 1, 2004].

"CardilQ" product description, [online], http://egems.gehealtcare.com/geCommunity/Europe/flex_trial/awFlexTrial/aw3_1/eflextrial [retrieved Dec. 1, 2004].

* cited by examiner

Registration of Coronary Sinus and Left Ventricle Using Fiducial Points

Registration of Coronary Sinus using Fiducial Features and Coronary Sinus Catheter

FIG. 8

METHOD AND SYSTEM FOR REGISTRATION OF 3D IMAGES WITHIN AN INTERVENTIONAL SYSTEM

CROSS REFERENCE TO RELATED APPLICATIONS

This application is a continuation-in-part of U.S. application Ser. No. 10/063,064, filed Mar. 15, 2002, the contents of which are incorporated by reference herein in their entirety.

This application is also a continuation-in-part of U.S. application Ser. No. 10/065,595, filed Nov. 1, 2002, the contents of which are incorporated by reference herein in their entirety.

This application is also a continuation-in-part of U.S. application Ser. No. 10/249,815, filed May 9, 2003, the contents of which are incorporated by reference herein in their entry.

This application also claims the benefit of U.S. provisional application No. 60/531,293, filed Dec. 19, 2003, the contents of which are incorporated by reference herein in their entirety.

This application further claims the benefit of U.S. provisional application No. 60/531,294, filed Dec. 19, 2003, the contents of which are incorporated by reference herein in their entirety.

BACKGROUND OF THE INVENTION

The present disclosure relates generally to cardiac treatment systems and, more particularly, to a method and system for registration of 3D anatomical models within an interventional system.

During a number of interventional procedures related to the improvement of electrical therapy in the heart, a physician manipulates catheters and/or leads inside the heart chambers. An example of the two most complex and common procedures include atrial fibrillation (AF) ablation, and bi-ventricular pacing. Atrial fibrillation, which refers to an arrhythmia in which the atria (upper chambers of the heart) stop contracting as they fibrillate, is the most common of the heart rhythm problems. In the United States alone, it is estimated that there are over 2 million people who have atrial fibrillation. Present data suggests that AF is the most common arrhythmia-related cause of hospital admissions. Patients with AF tend to have a high incidence of such complications as stroke and congestive heart failure. Premature atrial contractions may act as triggers and initiate paroxysms of AF. These premature atrial contractions have been shown to predominantly originate in and around the pulmonary veins from the left atrium. Since infrequent and non-reproducible premature atrial contractions may limit the utility of ablating trigger sites, a variety of surgical and catheter techniques have been used to isolate the pulmonary veins from the left atrium.

One of the surgical techniques used to treat (ablate) AF involves applications of radio frequency waves to create small scars on the heart's surface near the connection between the pulmonary veins and the left atrium. The small scars created by the radio frequency waves tend to stop the erratic impulses of AF by directing the impulses to follow a normal electrical pathway through the heart. This type of surgical procedure is commonly performed through a chest incision. Surgeons use specially designed instruments to deliver radio frequency waves or other forms of energy to the abnormal tissue, typically during the open-heart surgery performed for other reasons, such as valve surgery or bypass surgery for example. Although this type of surgical technique is effective when the patient is undergoing open-heart surgery for another reason, catheter-related treatment methods are more practical when the patient does not require the invasive open-heart surgery for other reasons.

One of the catheter techniques involves fluoroscopic guided positioning of catheter in the left atrium after going through a blood vessel, and the application of radio frequency energy at areas showing double potentials suggestive of sites capable of conducting between the left atrium and the pulmonary veins. It has also been shown that ablation at other sites such as between the mitral valve and left pulmonary veins, and between the pulmonary veins, as is done during the surgical intervention, may increase the success rate of AF ablation. Factors such as inadequate three-dimensional reconstruction of the left atrium using some currently available technologies, the inability of the physician to visualize the pulmonary vein ostia (opening of these veins into the left atrium) from inside, the varying size of the pulmonary veins and thus the pulmonary vein ostia, the difficulty in keeping the mapping and ablation catheters stable at the pulmonary vein ostial and other important sites in the left atrium due to the complex 3D geometry of these areas, all make current approaches to mapping and ablation using current fluoroscopically guided techniques somewhat cumbersome and lengthy. Because of these limitations, catheter ablation, especially in patients with persistent atrial fibrillation, is not very successful. It is estimated that less than 20 percent of patients with persistent AF, undergoing radio frequency ablation for AF, benefit from this approach.

One another factor that may be associated with the above mentioned limitations is that the operator typically guides an interventional tool using mainly the fluoroscopy images. A typical task in such a procedure is the placement of a catheter at a specific location, such as one of the pulmonary veins for example. However, these anatomical structures are not well depicted by the x-ray system since they do not present contrast versus the surrounding anatomical structures.

Another important medical procedure, as mentioned above, involves bi-ventricular pacing in the treatment of heart failure. Despite considerable progress in the management of congestive heart failure (CHF), it remains a major health problem worldwide. It is estimated that there are 6-7 million people with CHF in the United States and Europe, and approximately 1 million patients are diagnosed with CHF every year. Despite significant advances in the treatment of CHF using various pharmacological therapies, quality-of-life in patients with CHF is poor as they are frequently hospitalized, and heart failure is a common cause of death. In addition, there is significant cost attached to this problem.

Normal electrical activation in the heart involves activation of the upper chambers, called the atria, followed by simultaneous activation of both the right and the left lower chambers, called the ventricles, by the left and right bundle branches. As patients with advanced CHF may have conduction system disease, which may play a role in worsening cardiac function, pacing therapies have been introduced in an attempt to improve cardiac function. One frequently noted conduction abnormality is left bundle branch block (LBBB). In one study, (Xiao HB, et al. *Differing effects of right ventricular pacing and LBBB on left ventricular function.* Br Heart J 1993; 69:166-73) 29% of patients with CHF had LBBB. Left bundle branch block delays left ventricular ejection due to delayed left ventricular activation as the electrical impulse has to travel from the right to the left side leading to sequential rather than simultaneous activation, as mentioned before. In addition, different regions of the left ventricle (LV) may not contract in a coordinated fashion.

Cardiac resynchronization, also knows as Bi-Ventricular (Bi-V) pacing, has shown beneficial results in patients with CHF and LBBB. During Bi-V pacing, both the right and the left ventricle (RV, LV) of the heart are paced simultaneously to improve heart-pumping efficiency. It has also been shown recently that even some patients with no conduction system abnormalities, such as LBBB, may also benefit from the Bi-V pacing. During Bi-V pacing, in addition to the standard right atrial and right ventricular lead used in currently available defibrillators or pacemakers, an additional lead is positioned into the coronary sinus. The additional lead is then advanced into one of the branches of the coronary sinus overlying the epicardial (outer) left ventricular surface. Once all of the leads are in place, the right and left ventricular leads are paced simultaneously, thus achieving synchronization with atrial contraction.

There are, however, several problems with this approach. First, this type of procedure is time-consuming. Second, placement of the LV lead is limited to sites available that provide reasonable pacing and sensing parameters. Third, cannulating the coronary sinus may be challenging as a result of an enlarged right atrium, rotation of the heart, or presence of Tebesian valve (a valve close to the opening of the coronary sinus). Coronary sinus stenosis (occlusion) has also been reported in patients with prior coronary artery bypass surgery, further complicating the problem.

In most instances, problems with the placement of the coronary sinus lead are identified at the time of the interventional procedure. In the event of the coronary sinus lead placement procedure being abandoned, the patient is brought back to the operating room and the LV lead is positioned epicardially. During this procedure, an incision is made on the lateral chest wall and the lead is placed on the outer side of the left ventricle. Unfortunately, there are many problems with epicardial lead placement as well, some of which include, but are not limited to: a limited view of the posterolateral area of the left ventricle using the incision of the chest wall, also called minithoracotomy; the limited number of placement sites providing reasonable pacing and sensing parameters; the inability to identify the most appropriate location and placement of the lead at the most appropriate site; the potential risk of damaging the coronary arteries and venous system; and difficulty in identifying the ideal pacing site as a result of one or more of the above limitations.

It has also been shown that LV pacing alone may be as effective as Bi-V pacing. However, due to the unstable nature of the coronary sinus lead, a pacing and sensing lead is usually placed in the right ventricle in currently used techniques.

Cardiac CT may be used to create a roadmap of coronary sinus and left ventricular anatomy such that appropriate sites may be identified for the placement of a LV pacing lead for Bi-V/LV pacing, either at the most appropriate branch of the coronary sinus, or on the left ventricular wall epicardially (from outside). CT or MR imaging may also identify areas devoid of blood vessels and nerves, as well as scar tissue. These modalities may also be used to determine the asymmetric contraction of the ventricles and identify different regions of the ventricles not contracting in a coordinated fashion. The presence of scarring from previous heart attacks may make this uncoordinated contraction even worse.

During an interventional procedure, the operator may guide an interventional tool by primarily using the fluoroscopic images. However, strategically important anatomical structures (such as the left atrium and pulmonary veins in the case of AF interventional procedure planning, and the coronary sinus and its branches in the case of bi ventricular pacing planning, for example) are not depicted by the x-ray system, since they do not present contrast versus the surrounding anatomical makeup.

In some cases, the operator may also use an interventional tracking system having a catheter-based tracking system equipped with navigational functionality, which is able to provide the location of the catheter in a given referential. However, navigational information provided by the probe is not displayed in the true 3D model.

While existing medical systems and procedures may be suitable and appropriate for certain medical conditions, significant procedural limitations still exist. Accordingly, there remains a need in the art for an improved method and apparatus for registering 3D models of anatomical regions with an interventional system and using the registered 3D models to track a catheter and or/leads to overcome these drawbacks.

BRIEF DESCRIPTION OF THE INVENTION

The above discussed and other drawbacks and deficiencies of the prior art are overcome or alleviated by a method for registration of cardiac image data in an interventional system. In an exemplary embodiment, the method includes inserting a first plurality of fiducial points on an acquired 3D anatomical image and exporting the 3D anatomical image, with the first plurality of inserted fiducial points thereon, to an interventional system. A second plurality of fiducial points is inserted on the exported 3D anatomical image using the interventional system, and the first and said second plurality of fiducial points are aligned to one another so as to register the exported 3D anatomical image with the interventional system.

In another embodiment, a method for registration of cardiac image data in an interventional system includes identifying one or more anatomical features on an acquired 3D anatomical image, and exporting the 3D anatomical image to an interventional system. An instrument is navigated and localized to locations corresponding to the one or more identified anatomical features on the exported 3D anatomical image using the interventional system. The localized instrument locations are aligned to the one or more identified anatomical features on the exported 3D anatomical image so as to register the exported 3D anatomical image with said interventional system.

In still another embodiment, a method for reducing motion artifacts for a three dimensional, anatomical image registered with an interventional system includes marking locations on a cardiac image acquired from an imaging system, at a selected phase of a cardiac cycle. The marked, acquired cardiac image is imported into an interventional system, and corresponding locations are marked on the imported cardiac image using the interventional system, wherein the corresponding locations are also marked at the selected phase of the cardiac cycle.

BRIEF DESCRIPTION OF THE INVENTION

Referring to the exemplary drawings wherein like elements are numbered alike in the several Figures.

DETAILED DESCRIPTION OF THE INVENTION

Disclosed herein is a method and system for registration of anatomical images within an interventional system, in which imported, segmented images (in the form of a 3D model) are registered with an interventional system through the use of deposited fiducial points on the 3D model and/or the navigation and localization of an instrument (e.g., catheter, pacing lead) with respect to one or more identified anatomical features (e.g., the left atrium/pulmonary vein junction of the heart, the coronary sinus, superior vena cava (SVC), etc.). Moreover, the present invention embodiments provide for improved reduction of motion artifacts due to cardiac and respiratory motion by image segmentation, fiducial point deposition and instrument location at about the same phase of the cardiac cycle for example about 75% of the R-R cycle during sinus rhythm, and about 45% to 50% of the R-R interval during atrial fibrillation which can cause fast and irregular R-R intervals. Although the exemplary embodiments illustrated hereinafter are described in the context of a CT imaging system, it will be appreciated that other imaging systems known in the art are also contemplated with regard to acquiring the cardiac data to be registered.

The unique features of invention include, among other aspects: using fiducial points deposited in the anatomical model and the corresponding point pairs in the interventional system to register the 3D anatomical model; registering the 3D anatomical model by aligning the anatomical features in the 3D model with a tool such as a catheter or electrodes of the catheter visualized on the interventional system; and registering the 3D anatomical model with the interventional system in the same cardiac and respiratory cycle to avoid motion artifacts.

Figure 1:
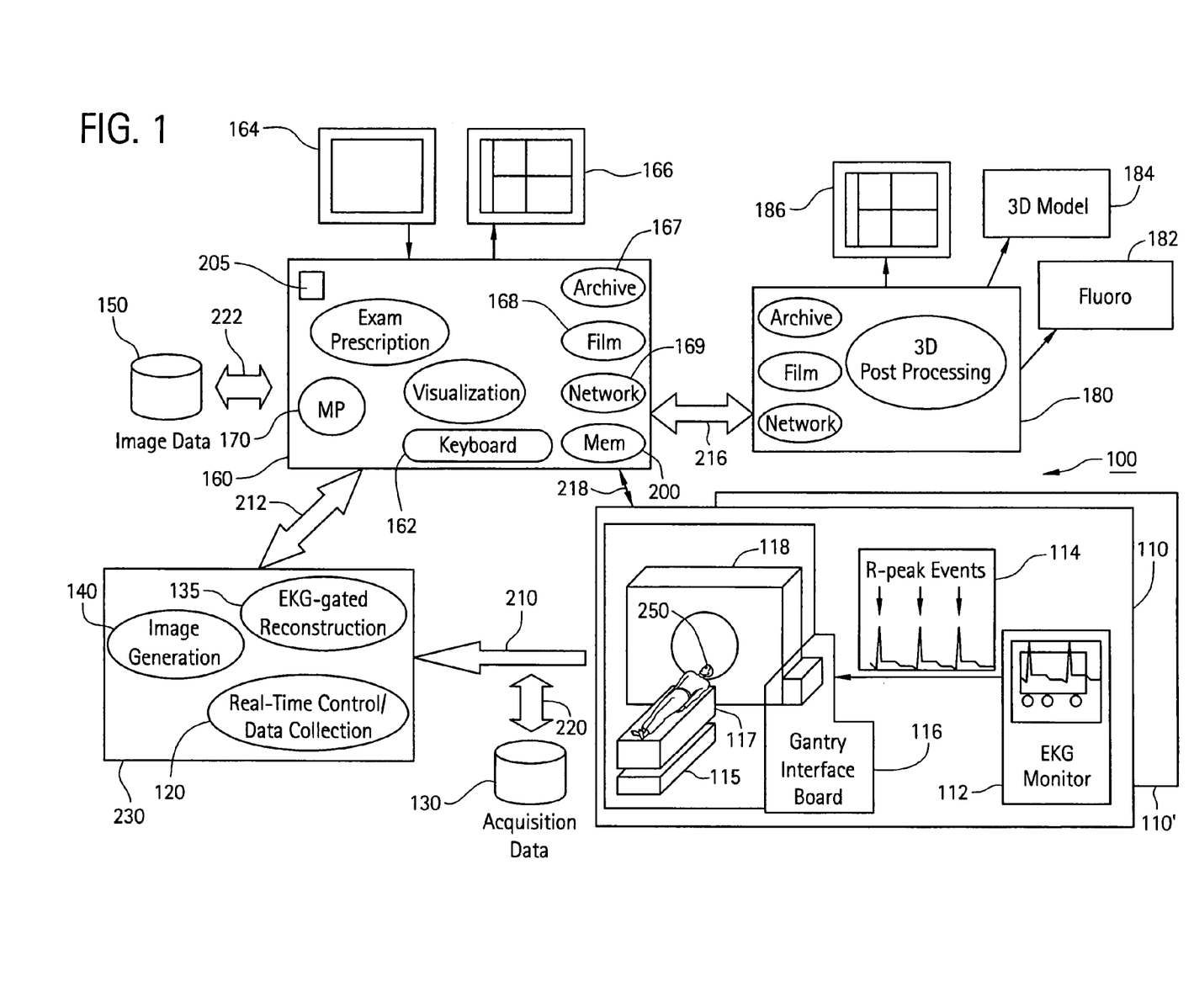
FIG. 1 is a generalized schematic diagram of a medical imaging system, such as a computed tomography (CT) system, suitable for use in accordance with an embodiment of the invention.

Referring initially to FIG. 1, there is shown an overview of an exemplary cardiac computed tomography (CT) system 100 suitable for use in a medical intervention procedure, such as an atrial fibrillation ablation procedure, or a bi-ventricular procedure, for example. Again, it should be understood that the cardiac CT system 100 is presented by way of example only, since other imaging systems known in the art (e.g., magnetic resonance, ultrasound) may also be used in an embodiment of the present invention.

In particular, FIG. 1 depicts a generalized schematic of an imaging system 100 suitable for use in accordance with an embodiment of the invention. As is shown, the imaging system 100 includes an imaging apparatus 110 for generating cardiac image data, such as, for example, image data of the left atrium and the coronary sinus, a data acquisition system 120 for acquiring the cardiac image data from imaging apparatus 110, an acquisition database 130 for storing the cardiac image data from data acquisition system 120, an image generation system 140 for generating a viewable image from the cardiac image data stored in acquisition database 130, an image database 150 for storing the viewable image from image generation system 140, an operator interface system 160 for managing the imaging apparatus 110 and the cardiac image data and viewable image in databases 130, 150 (which may be combined into one database), and a processing system 180 for analyzing and displaying the viewable image in database 150 and being responsive to operator interface system 160. Processing software in processing system 180 includes instructions, and is therefore adapted to analyze data and display images, thereby converting processing system 180 from a general processor into a specialized processor. Scanned data that is capable of being converted into a viewable image is referred to herein as image data.

System communication links 210, 212, 216, 218 and database communication links 220, 222 provide a means for signal communication amongst and between systems 110, 120, 140, 160, 180 and databases 130, 150. Communication links 210-222 may be hardwired or wireless, for example. Operator interface system 160 may be a standalone input/output terminal or a computer including instructions in a variety of computer languages for use on a variety of computer platforms, such as but not limited to, for example, DOS™-based computer systems, Apple™-based computer systems, Windows™-based computer systems, HTML-based computer systems, specialized program language-based computer systems, or the like.

Operator interface system 160 includes a processor 170, such as, for example, a microprocessor (MP) or any other processing circuit suitable for the purposes disclosed herein, for managing the imaging apparatus 110, for managing the data acquisition and image generation systems 120, 140, for processing and managing the information in acquisition and image databases 130, 150, and for managing the processing at processing system 180. Operator interface system 160 also includes a memory 200 that contains specific instructions relating to medical scanning procedures, user input means, such as, for example, a keyboard 162, and user output means, such as, for example, displays 164, 166. In an embodiment, interface system 160 and processing system 180 may be integrally arranged. Display 164 may be adapted for exam prescription, and display 166 may be adapted for visualization. Alternatively, displays 164 and 166 may be integrated into one display. Exam prescription includes such input parameters as CT scan or region of scan control, data acquisition control, and the like. Operator interface system 160 may also be employed during an actual interventional procedure to display fluoroscopy images, 3D CT images, and the interventional system with the exported 3D images as discussed below. During an actual medical interventional procedure, data port 205 accepts information from a medical probe, such as, for example, a catheter 260, thereby permitting data analysis in a real-time fashion during the actual interventional procedure.

Imaging apparatus 110 includes an electrocardiogram (EKG) monitor 112 that outputs R-peak events 114, which generally delineate the beginning of a heart cycle, through an interface board (patient interface unit) 116 into a scanner (components 115, 117 and 118), such as a CT scanner for example with a patient 250. Scanner 115, 117, 118 is generally referred to hereinafter as one or more image acquisition systems. The interface board 116 enables synchronization between the scanner data and the EKG monitor data. Alternatively, the interface board 116 may be used to couple the EKG monitor 112 to the scanner 118. An example of an interface board 116 is a Gantry interface board. An exemplary scanner 118 is a cardiac computed tomography (CT) system with support for cardiac imaging. ECG gated reconstruction followed by segmentation reconstruction of 3D models (in diastolic phase) allows imaging of the heart free of motion.

During sinus rhythm, segmentation reconstruction will be done at about 75% of cardiac cycle (in diastole). Phase location is selected at around 45% of the cardiac cycle where the patient is in atria fibrillation. This phase is chosen as the R-R intervals are shorter. However, the illustrated scanner 118 is for exemplary purposes only; other imaging systems known in the art may also be used. Examples of other imaging systems include, but are not limited to, X-ray systems (including both conventional and digital or digitized imaging systems), magnetic resonance (MR) systems, positron emission tomography (PET) systems, ultrasound systems, nuclear medicine systems, and 3D fluoroscopy systems.

Referring still to FIG. 1, imaging apparatus 110 also includes EKG gated acquisition and image reconstruction 135 capabilities to image the heart free of motion, typically in its diastolic phase. Interfacing with EKG monitor 112 allows real time acquisition of the cardiac electrical impulses and allows gated acquisition or retrospective reconstruction of the acquired data. As mentioned previously, during sinus rhythm (for example) it could be 75%, and during atria fibrillation at about 45% due to shorter R-R intervals. This allows elimination of the cardiac motion by imaging the heart in the same phase of the diastole. The acquired data may be stored on a database or used to generate the required image by using one or more protocols optimized for imaging. In an embodiment, the image data stream from image generation system 140 is communicated via link 212 to the operator interface system 160 for display and visualization, and communication link 216 to processing system 180. The image data used by software at operator interface system 160 for exam prescription and visualization may be stored in image database 150. The imaged data may be archived 167, put on a film 168, and/or sent over a network 169 to processing system 180 for analysis and review, including 3D post-processing. The 3D model image 184 may be viewed singly or on an interventional system 186 to which it has been exported, using a DICOM file for example. Display 182 may be used, for example to display projection fluoroscopy images. The fluoroscopy system 182, along with the interventional system, can be linked to the 3D processing system 180 and used to display and register images. In the case of AF planning, post-processing software at processing system 180 allows detailed 3D and endocardial views of the left atrium and pulmonary veins. These images and others may be stored on the hard drive, CD ROM etc., for example and viewed at the time of the interventional procedure.

Imaging apparatus 110 further includes circuitry for acquiring image data and for transforming the data into a useable form, which is then processed to create a reconstructed image of features of interest within the patient. The image data acquisition and processing circuitry is often referred to as a "scanner," regardless of the type of imaging system, because some sort of physical or electronic scanning often occurs in the imaging process. The particular components of the system and related circuitry differ greatly between imaging systems due to the different physics and data processing requirements of the different system. However, it will be appreciated that the present invention can be applied regardless of the selection of a particular imaging system.

Data is output from imaging apparatus 110 into subsystem 230, which includes software to perform data acquisition in data acquisition system 120 and image generation in image generation system 140. Data control is either provided by operator interface system 160 or within subsystem 230 via communication link 212. Data that is output from the imaging apparatus 110, including R-peak events 114, is stored in the acquisition database 130. Data acquisition in system 120 is performed according to one or more acquisition protocols that are optimized for imaging the heart, and specifically for imaging the right atrium and/or coronary sinus.

In an exemplary embodiment, the 3D image data of the atrium is created using a protocol that is optimized for the left atrium, such as coronary artery imaging protocol or CardEP protocol for example. Exemplary parameters used in these protocols include 0.5 second Gantry periods with 0.375 helical pitch factors, 120 kilovolts, 250 milliamps and 0.625 or 1.25 mm (millimeter) slice thickness. These functions may be performed with commercially available off the shelf software tools, such as Advanced Vessel Analysis (AVP) or CardEP for example. After the above mentioned tools are applied to the image data, further processing may be applied, such as thresholding, floater filtering, and scalping, for example. These processes are used to clean up the images and may be automated. Automated processes may require queues from the operator as the operator is stepped through the process by the operating software. Following the image clean up process, the remaining cardiac chambers are eliminated and only the left atrium is visualized. A detailed 3D image of the left atrium and the pulmonary veins may then be created. The 3D and endocardial (view from inside) are visualized using volume rendering techniques using a variety of volume rendering commercially available software packages, such as VR and Cardiac Image Quality (CARDIQ) for example. Once the 3D images are created, the 3D model geometry is then exported and registered with an interventional) system.

There are several available cardiac interventional systems known in the art that can track catheters using a variety of different techniques. Any of these systems could be used to track the catheter or lead over the registered models. As an example, the LocaLisa™ system of Wittkampf, et al. uses 1 mA current electromagnetic fields at approximately 30 kHz emitted from cutaneous patches placed on the subject's chest. These patches are positioned to create a three-dimensional axis system. In addition to the connection of a position reference catheter and a mapping/ablation catheter the LocaLisa™ system provides several other channels to record from several different catheters. Catheters in the subject's heart receive these signals, and from the magnitude of the signals, the catheter's position can be determined. One current limitation of the LocaLisa™ system is that it merely provides the user with information about the catheter position, no anatomic geometry model can be created. Another interventional system that may be used is a fluoroscopy system.

In the present context, registration generally refers to the process of aligning 3D anatomical images with an interventional system. Registration is thus a determination of a geometrical transformation that aligns points or anatomical features in one view of an object with the corresponding points or and/or anatomical features in another view of that object. The view in the context of the present embodiment will be use to include a 3D model. As there are two different modalities being used in the same subject this will be referred to as intrasubject multimodality registration.

Most medical images are displayed and stored as digital images, and are made up of a small array of square or rectangular elements called pixels. Each pixel has an associated image intensity value. This array provides the coordinate system of the image. An element in the image can be assessed by its 2D position within this array. If a CT slice is formed of 512×512 pixels, for example, each slice will correspond to an element of the cut through the patient of about 0.5×0.5 mm². The images are than stacked together. Each pixel thus corresponds to a small volume of tissue, which is called a voxel. In a slice spacing of 0.75 mm, for example, the voxel size will be 0.25×0.25×0.75 mm³.

The number of parameters needed to describe a Transformation-T (Registration) is being referred to herein as the degrees of freedom. If the imaging and registration is being performed within a short interval of each other, it is unlikely that the anatomy of an organ such as the heart and the chamber being imaged and registered (for example, the left atrium) will change significantly. In view of this, it is assumed that the imaged and registered anatomical structure should behave as a rigid body. Under this assumption, 3 translations and 3 rotations, which give 6 degrees of freedom, can lead to a successful registration. In addition, however, the voxel size in each modality may not be the same. Thus the modality used for imaging such as the CT scanner and the interventional system will need to be calibrated to achieve appropriate dimensions. This requires 3 extra degrees of freedom for calibration of the size or scaling.

Using post processing software available on the windows workstation, points (which referred to hereinafter as "fiducial" points) may be marked on the segmented model of the anatomical structure and the axial slice at the point of interest, as detailed later herein. The 3D image with marked fiducial points can be transferred as a DICOM file to the interventional system. Using a mapping and ablation catheter, the fiducial points can also be marked on the interventional system at or near these locations as well. Through the use of fluoroscopy, for example, the location of catheters already placed in anatomical structures such as the coronary sinus, and intracardiac recordings from the mapping and ablation catheter can be used to mark the fiducial points on the interventional system. The demonstration of double potentials, suggesting that the location of the catheter is near the left atrial-pulmonary vein junction, can further help identify the appropriate locations. Although several fiducial points or a cluster of points may be used, at least 3 non-collinear points are necessary.

Once the 3D image is transferred using a DICOM file a set of corresponding point pairs, for example, x and y points are identified on the anatomical structure. The registration is then achieved by selecting a transformation that will align these points. Each view involved for this geometric transformation in this embodiment is referred to as a coordinate system that defines the space for that particular view. A geometric transformation, for the purpose of the present embodiment, is further described as a mapping of points; for example, x from the space X (CT model) to the y in space Y (interventional system). The next step is to then find the least square transformations that will align these fiducial points.

The registration error will thus be any non zero displacement described by the equation:

T(x)−y if $T(x)=Rx+t$ where R is being referred to as rotation and t as translation. Alignment of fiducial points in the two views will thus lead to a smaller registration error. Fiducial misalignment can be expressed as a root mean square error. In this embodiment, this error will be called as the fiducial registration error (FRE).

In a rigid body transformation as being described in our embodiment it can be calculated as:

$$FRE = \left(\frac{1}{N}\right)\sum_i^N w_i^2 [Rx + t - y]^2$$

Where N is the number of fiducial points used and $w_i^2$ is a non-negative weighting factor, which may be used to decrease the influence of less reliable fiducials. Optimal registration can thus be achieved by minimizing the FRE. To minimize the difference between the two coordinate systems, one co ordinate system will be rotated and translated with respect to the other. The solution to the minimization problem is unique, unless the fiducial points are collinear. As detailed later herein, non-collinear fiducials are used.

Singular value can be used to analyze and solve least square problems. The only requirement for the method to work is that the matrix is of full rank that is it does not have zero as a singular value. This will be the case in the embodiment, as the fiducial points selected are not collinear (on the same line). Several packages such as the MATLAB or EISPACK are available for eigen analysis (i.e., computation of eigenvalues and eigenvectors). If only 3 points or less are used, the inverse of the matrix can be used. If there are too many equations, H=UAV may be used to change the non-square to square matrix. In the case of rotation, for example, the diagonal matrix is interposed to ensure that the R is a proper rotation (not a reflection).

The registration process may be executed once the previously mentioned parameters are identified. The degree of interaction between the two images may be interactive, semi-automatic and/or automatic. During interactive method human interference will be needed for determination of transformation. In a semiautomatic method, a computer will determine the transformation, while user interaction will be needed for the selection of appropriate images and properties to be used for registration. Automatic methods will need no human interaction.

Other measures, such as intensity-based methods, may be used as an alternative registration basis to using fiducial points or anatomical features. Registration in this case between the two images will involve calculating a transformation using the voxel values. Voxel similarity measures can than be calculated for the set of voxels in the overlapping region. In the case where there is no misalignment between the images, the square of the intensity difference will be zero. However, as intrasubject multimodality registration involves recovery of 3 translations and 3 rotation parameters, a simple cost function assuming a linear relationship between the voxel intensities may not thus be useful.

Accordingly, the novel approach thus described in the present embodiment involves registration of anatomical structures, such as the left atrium and pulmonary veins, which are important in treating cardiac arrhythmias for example atrial fibrillation. A similar approach can be used for registration of other anatomical structures such as coronary sinus and the left ventricle during Bi-ventricular pacing. In addition to the fiducial points, a tool such as a catheter placed in an anatomical structure can be used to register the anatomical model.

There may be significant difficulty in identifying and aligning anatomical landmarks in two coordinate spaces for successful registration. Instead of aligning anatomical structures, another unique feature of the present invention embodiments involves registration performed by aligning the anatomical structures with an instrument such as a catheter or a lead placed by the physician in the anatomical structure. Although other instruments can be placed in an anatomical structure, the exemplary embodiments disclosed herein use a catheter placed in the superior vena cava and coronary sinus or a lead placed in the superior vena cava and the right ventricle.

Figure 2:
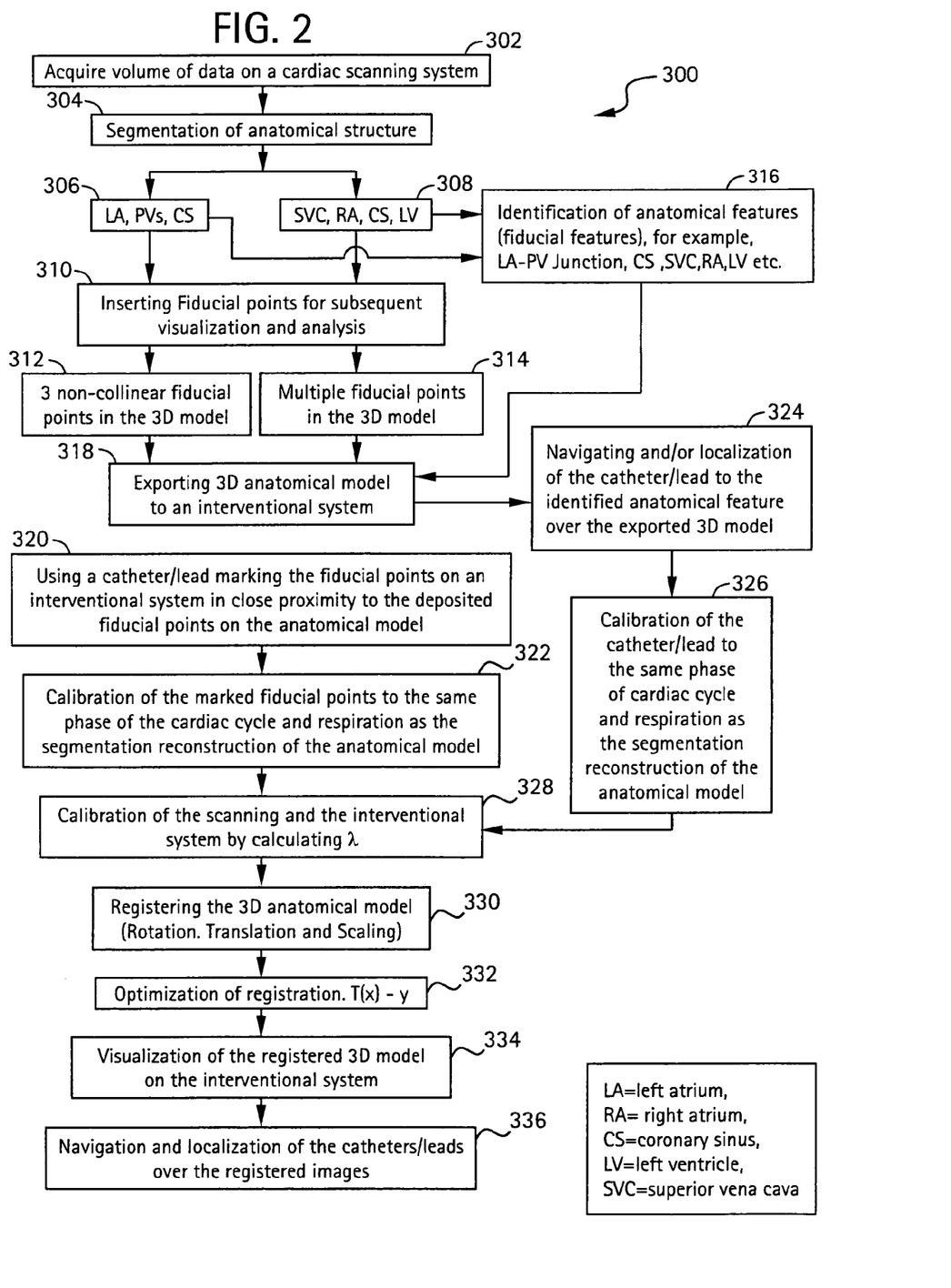
FIG. 2 is a flow diagram of a method for registration of acquired medical images within an interventional system, using the imaging system of FIG. 1, in accordance with an embodiment of the invention.

Referring now to FIG. 2, there is shown a flow diagram of an exemplary method 300 for registration of 3D model images (e.g., CT images) with an interventional system in accordance with an embodiment of the invention. As shown in block 302, a volume of data is acquired, such as through the imaging system 100 of FIG. 1. The acquired anatomical image data is then segmented (preprocessed) as shown in block 304 to generate 3D images of anatomical features such as the left atrium, pulmonary veins, superior vena cava and coronary sinus (block 306), or the superior vena cava, right atrium, coronary sinus and left ventricle (block 308), depending on the subsequent interventional procedure to be performed.

In one path, the method 300 proceeds to block 310, where fiducial points are inserted in the generated 3D anatomical models for subsequent visualization and analysis. In this regard, at least three non-collinear fiducial points are inserted into each model, as shown in block 312. Although 3 are preferred, several fiducial points may also be inserted into the 3D models, as shown in block 314. Alternatively, method 300 may also be implemented by the identification of actual anatomical features which in this embodiment will also be described are also called fiducial features within the 3D models, as shown in block 316. In the case of registration of a 3D left atrial model, the anatomical or fiducial features that may be used include, but are not limited to: left atrium, left atrial pulmonary vein junction, coronary sinus and the superior vena cava. In the case of bi ventricular pacing, again the anatomical or fiducial features that may be used include, but are not limited to: the superior vena cava, coronary sinus, right atrium and the left ventricle. In either case, the 3D anatomical models (with deposited fiducial points or with identified features/landmarks) are then exported to the interventional system (for example, using standard process such as DICOM 3 files), as shown in block 318.

In an alternative approach (e.g., in the case of bi-ventricular pacing), and instead of the catheter as described later on, multiple fiducial points can be taken in an anatomical structure, such as the superior vena cava, ostium and coronary sinus. These structures can be aligned with a segmented model in the even a catheter is already placed in the sinus. In additional to the superior vena cava points, the catheter could be used to deposit multiple coronary sinuses as well. The superior vena cava and the coronary sinus structures can then be aligned with the segmented model, and registration achieved using a transformation.

Where fiducial points are inserted onto the exported 3D model, method proceeds to block 320, at which point a catheter and or/lead is used to mark fiducial points on the corresponding interventional system model, in close proximity to the deposited fiducial points on the exported 3D model. Then, the marked fiducial points on the interventional system model are calibrated to the same phase of the cardiac and respiration cycles as the points on the exported (segmented) 3D model, as shown in block 322.

Correspondingly, where anatomical or fiducial features are identified on the exported 3D model, the catheter and or/lead is navigated and aligned to the identified anatomical feature(s) over the exported 3D model, as shown in block 324 and described in further detail hereinafter. Thereafter, a calibration of the catheter/lead to the same phase of the cardiac and respiration cycles as the segmented 3D model is performed, as shown in block 326. In particular, a catheter, in the case of atrial fibrillation ablation for example, can be navigated to the fiducial feature identified such as the left atrial—pulmonary vein junction to optimize the registration process. This location can also be confirmed using fluoroscopy and intracardiac recordings.

Regardless of whether fiducial points or identified anatomical landmarks are used to calibrate the interventional system model with the exported 3D model from the scanning system, method 300 then proceeds to block 328, for a further calibration of the scanning system with respect to the interventional system by calculating a scaling factor, $\lambda$, for adjusting the scale of the scanning system model with respect to the interventional system model.

Then, as shown in block 330, the exported 3D anatomical model is registered with the interventional system by a series of rotational, translational and scaling adjustments. In other words, the coordinate systems are rotated such that the point pairs or features are aligned to one other to optimize registration. The generation of a translation factor (tx, ty, tz) is relatively straightforward and may use known techniques and processes, such as aligning the centers of common anatomical structures, for example. The processing circuit may be configured to process executable instructions for generating a translation factor for translating 3D models with respect to the CT image. In principle, the alignment method can also compensate for a rotation along an axis perpendicular to the projection plane.

Assuming that the system used for registration is calibrated such that the patients centered referential is the same in terms of orientation, there will be minimal rotation between the two systems. Proper rotation can be calculated in terms of 3 angles of rotation, for example, $\theta x$, $\theta y$, and $\theta z$. Despite this, some error may occur due to rotational movement of the heart during systole and diastole. Other important aspects which will be taken into consideration will be the role CT gating and any changes due to respiration. During sinus rhythm segmentation reconstruction of the anatomical structure is done at 75% of the cardiac cycle (in diastole). Similarly, phase location during an abnormal rhythm such as atrial fibrillation can be selected at for example at 45% of the cardiac cycle. Fiducial points can be marked at the same phase on the interventional system to avoid any misalignment because of cardiac motion. As the CT scan is taken during the breath held in expiration, the fiducial points on the interventional system can be deposited also, for example, during the breath held in expiration. Any small error which may still exist can be corrected by knowing the exact degree of rotation the system need to be calibrated to correct for it by rotating the image on the interventional system by the same angle.

The scaling factor, $\lambda$, may be determined through known information from the common anatomical reference system, and discernable features of an instrument such as catheter. For example, an apparent dimension (such as catheter diameter) from the exported image can be compared with the known actual dimension (e.g., diameter of the catheter). From this information, the actual dimension of an anatomical structure in the exported image may be determined and compared with the image structure in the interventional system. Other measurable features may also be used for scaling purposes, such as the inter-electrode distance at the catheter, for example. The processing circuit can be configured to process executable instructions for generating a scaling factor adjusting the scale of the registered 3D model with respect to the CT image. In another approach, the actual size of a structure such as the pulmonary vein ostium or distance of the first branch of a pulmonary vein from the ostium is calculated and calibrated with the apparent dimensions on the registered images.

Following the registration of the exported 3D model, an optimization or error minimization step may be implemented, as shown in block 332 and as discussed above. The newly registered 3D model may then be visualized on the interventional system, as shown in block 334. Then, in block 336, the particular interventional procedure may be performed, such as by navigation and localization of the instruments (e.g., catheters, pacing leads) over the registered images that are visualized on the interventional system.

A unique aspect of the invention embodiments herein involves depositing of fiducial points in the 3D anatomical structure being registered. In the example of the left atrium, the fiducial points are (for example) deposited at predetermined sites during the CT segmentation. The sites such as the left atrial-right and left superior pulmonary vein junctions and the coronary sinus ostial location are chosen based upon the experience obtained from manipulating catheters in the left atrium as these sites can be easily accessed by the physician for navigating the mapping catheter for depositing points on the interventional system. This is significant, since although external fiducial markers can be easily used during an elaborate patient setup, the dislocation of these markers, as well as the almost immediate need for both imaging and registration, are obvious disadvantages of such an approach. These problems can be eliminated by using internal fiducial points as depicted in this embodiment.

Figure 3:
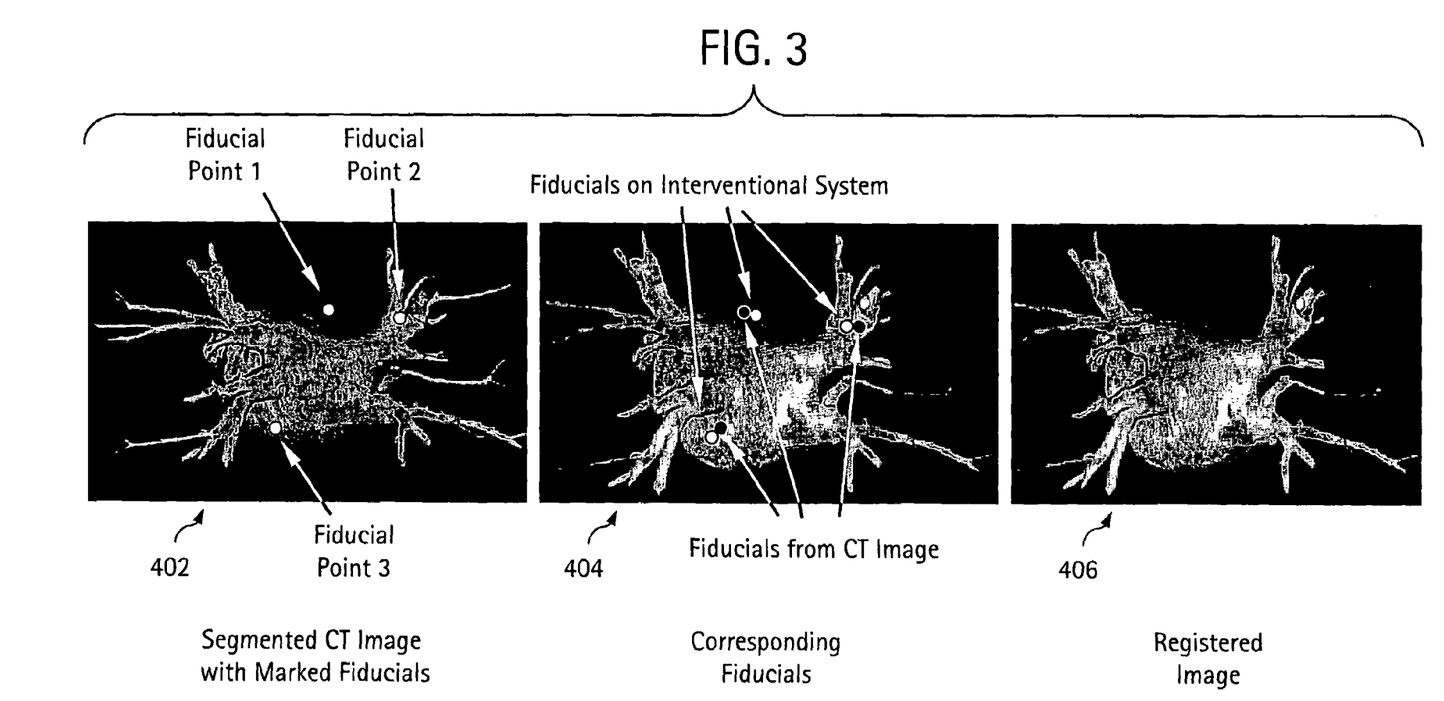
FIG. 3 depicts an exemplary sequence of 3D model images detailing initially deposited fiducial points on the image, the subsequent exportation of the images and fiducial points to an interventional system (where corresponding fiducial points are deposited), and the registration of the exported image.

FIG. 3 illustrates an exemplary sequence of 3D model images detailing initially deposited fiducial points on the model obtained from an imaging system, the subsequent exportation of the images and fiducial points to an interventional system, and the registration of the exported image. In particular, a first image 402 is a 3D cardiac CT model having a first set of fiducial points (Fiducial points 1, 2 and 3) deposited thereon. A second image 404 represents the exported 3D image 402 to the interventional system, and having a second pair of corresponding fiducial points deposited thereon. Following the alignment of the corresponding fiducial points, the registered image 406 results therefrom.

Figure 4:
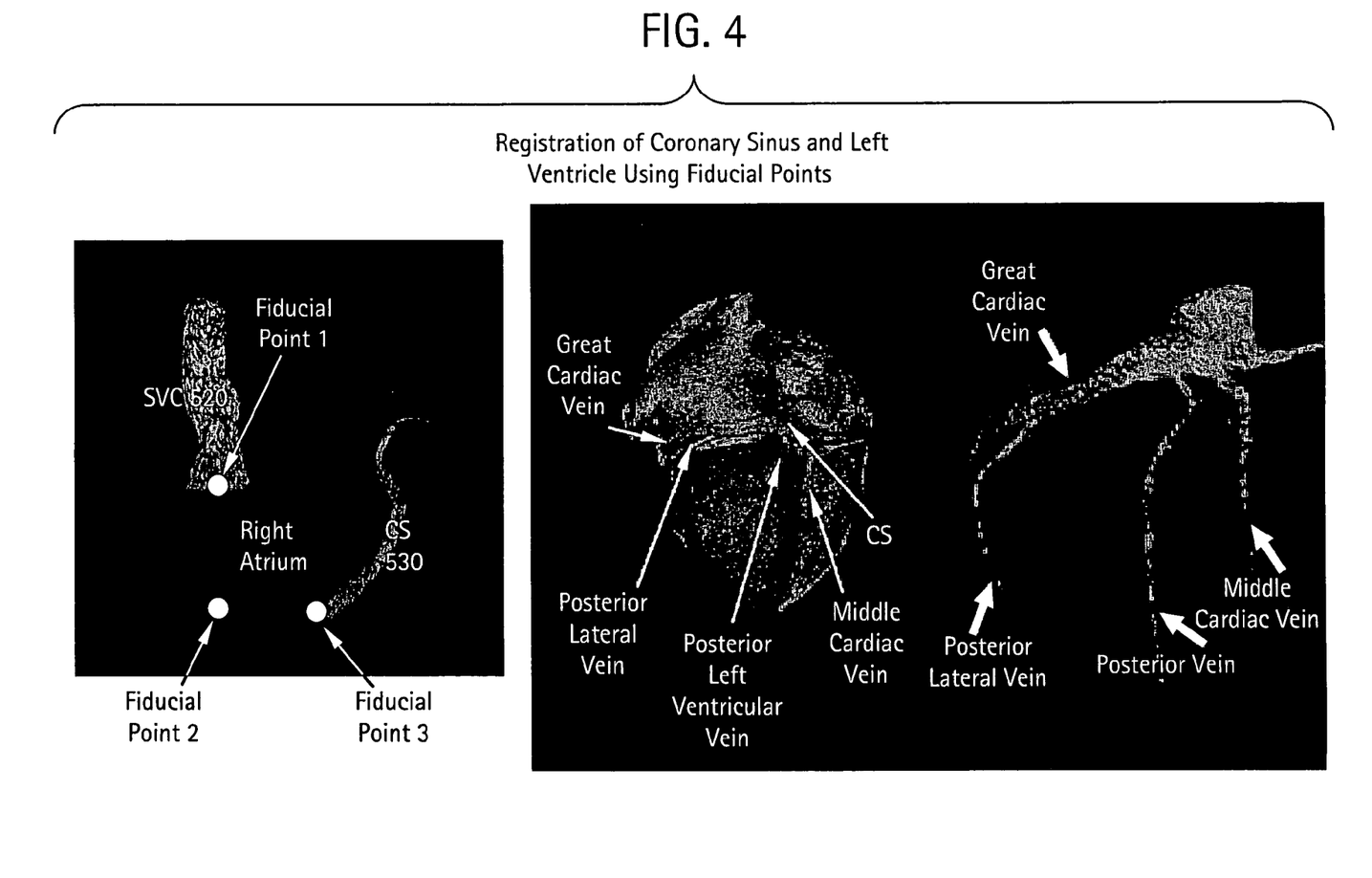
FIG. 4 depicts an exemplary sequence of 3D superior vena cava, and coronary sinus 3D images detailing initially deposited fiducial points on the image, and registration of the image for a bi-ventricular pacing intervention procedure.

In the case of biventricular pacing, as shown in FIG. 4, the fiducial points (although not so limited to) may be deposited at easily accessible sites such as the border of the superior vena cava (SVC 520) and the right atrium, the opening of the coronary sinus 530 area and the Inferior vena cava-right atrial junction, or the low right atrium creating non collinear points. As in the case of left atrial model after the segmented model with SVC, right atrium, coronary sinus and the left ventricle is exported to the interventional system the fiducial point pairs are used to achieve successful registration. In order to depict the registered features more clearly, the middle panel (as opposed to the antero posterior (AP) view) shows the postro anterior or the PA view of the heart including the left ventricle (LV) and the coronary sinus (CS) and its branches. As shown in the right panel, the segmentation process as detailed before can also allow detailed view of the CS 530 and its branches.

In another unique aspect of the invention as described in the block diagram, the anatomical features (also called the fiducial features) with a tool placed therein these can be used for registration. This aspect is described in further detail hereafter. During the atrial fibrillation interventional procedure, a catheter with multiple recording electrodes is usually placed in the coronary sinus. This catheter usually is placed from the jugular vein in the neck region and tracks down the superior vena cava and than to the coronary sinus. Similarly, the mapping and ablation catheter is placed in the left atrium using a transseptal approach. Both the mapping and ablation catheter in the left atrium and the coronary sinus catheter can be identified over the interventional system. This localization is quite accurate based upon the validation studies done in the currently available interventional systems. The location of these catheters can also be confirmed fluoroscopically and electrocardiographically especially at locations such as the left-atrial pulmonary vein junction. The electro grams in these areas show double potentials showing recordings from the left atrium and the pulmonary veins.

Figure 5:
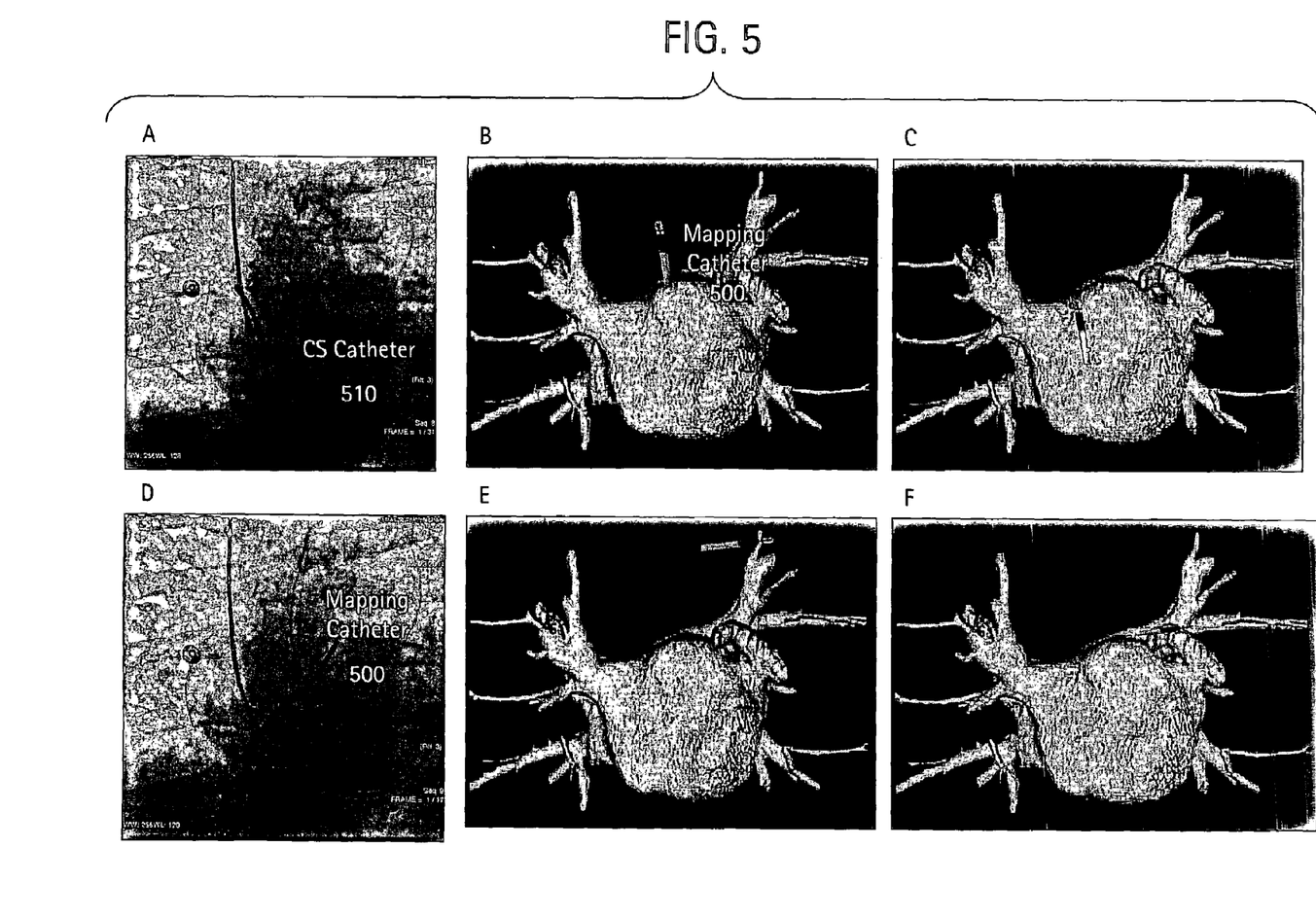
FIG. 5 depicts an exemplary sequence of aligning and registering of an exported 3D model on the interventional system using a catheter placed in the pulmonary veins as confirmed using fluoroscopy.
Figure 7:
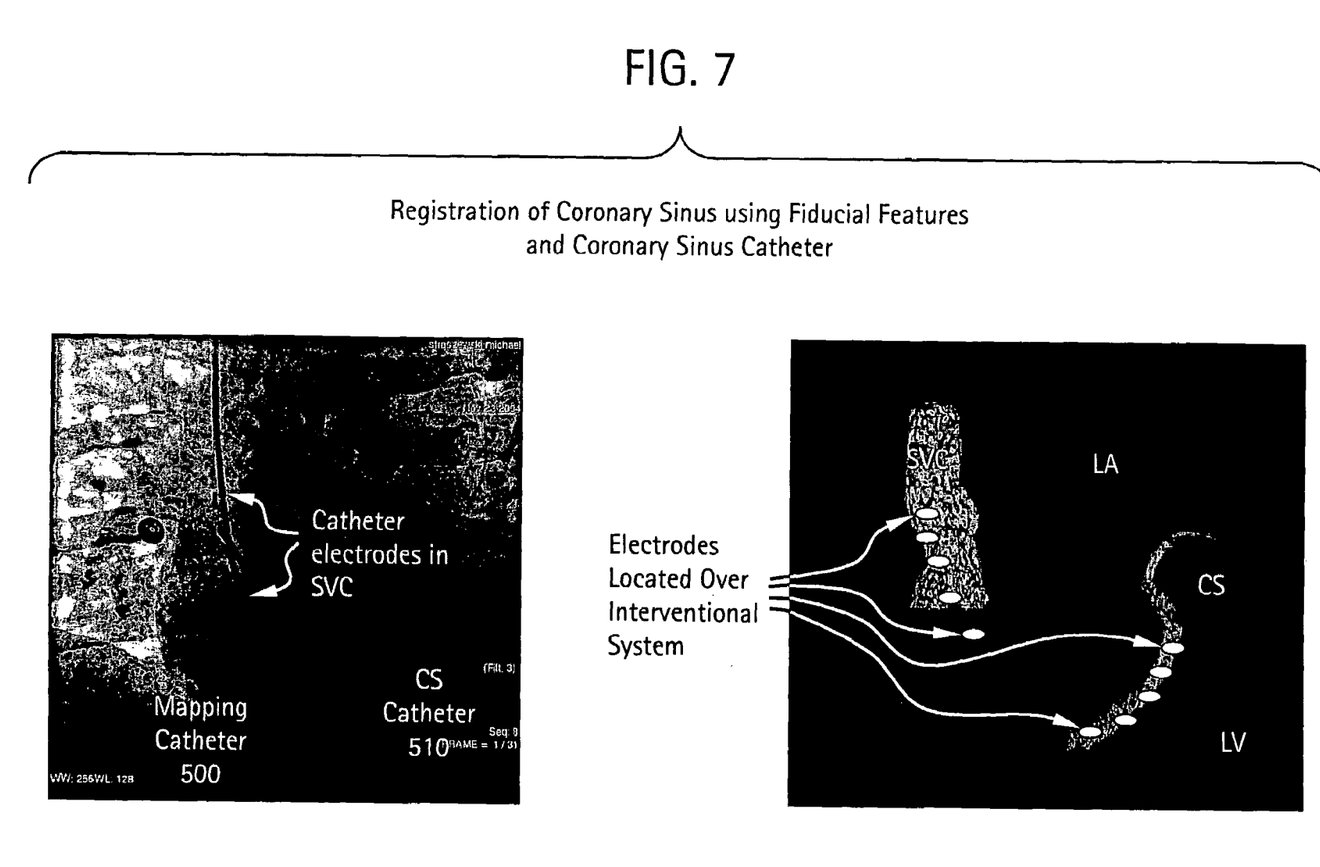
FIG. 7 depicts an exemplary sequence of aligning of exported 3D anatomical models on the interventional system using a catheter placed in the superior vena cava and coronary sinus as confirmed using fluoroscopy.

FIG. 5 depicts projection images (panels A and D) from a fluoroscopy system (e.g., fluoroscopy system 182 and interventional system 186). The location of the mapping and ablation and coronary sinus catheters 500, 510 are seen on the fluoroscopic images. The mapping and ablation catheter 500 is placed in the right superior pulmonary vein (panel A) and left superior pulmonary vein (panel D). The coronary sinus (CS) catheter 510 has multiple electrodes, some of which are visualized in the SVC and the coronary sinus. These electrodes can also be identified on the interventional system as shown in FIG. 7. The location of the catheter in the right and left superior pulmonary vein on the fluoroscopy image can be confirmed by injecting contrast (not shown) to confirm the location of the catheter and from the electro grams obtained from the catheter. Other areas, such as a chamber of the heart mitral or tricuspid valve annulus depicting the junction between the atria and the ventricles, can also be used. However, the embodiments of the invention are not intended to be limited to those anatomical regions and the structures disclosed herein. In panel B, both the location of the mapping and ablation catheter 500 and the exported left atrial 3D model 184 are seen on the interventional system 186. As depicted, there is significant error in the alignment of the two. A transformation can be identified which links the catheter and the location on the 3D model as shown in panel C. The catheter is then positioned in the left superior pulmonary vein, as shown in panel D of the fluoroscopy image, and the same process is repeated as set forth above to link the catheter and the 3D image to align the image properly and achieve proper transformation.

Figure 6:
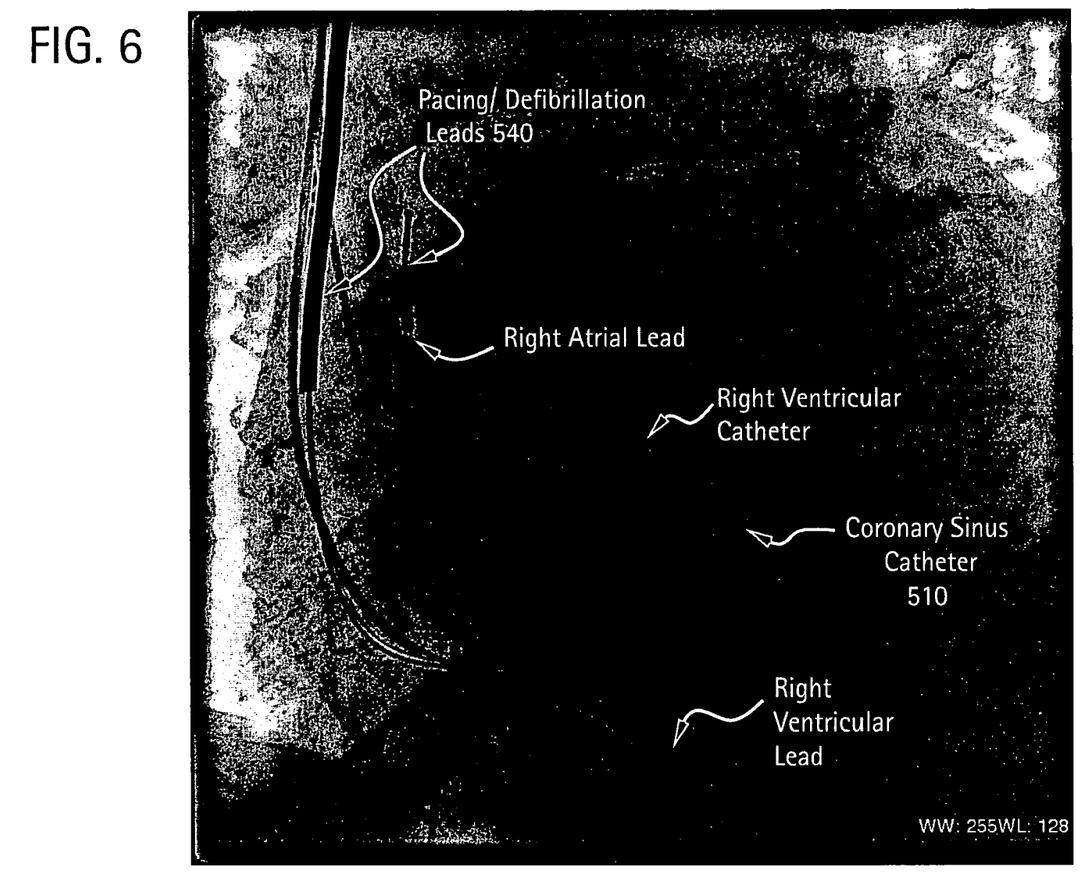
FIG. 6 depicts a fluoroscopy image showing the path of coronary sinus catheter and pacing and defibrillation lead as they are aligned in the superior vena cava, coronary sinus and the right ventricle.

In another aspect, the catheter positioned in the coronary sinus can be aligned with the above or used alone. FIG. 6 illustrates the location of a coronary sinus catheter 510 and pacing and defibrillation lead 540 on a fluoroscopy image. In the case of the coronary sinus catheter, after traversing the SVC and the right atrium, the catheter is positioned inside the coronary sinus. In case of the pacing and defibrillation lead for right ventricular pacing, the lead (like the coronary sinus catheter) traverses the SVC but is placed instead in the right ventricle. Alignment of the catheter or the lead with the segmented SVC may thus lead to successful registration.

Figure 8:
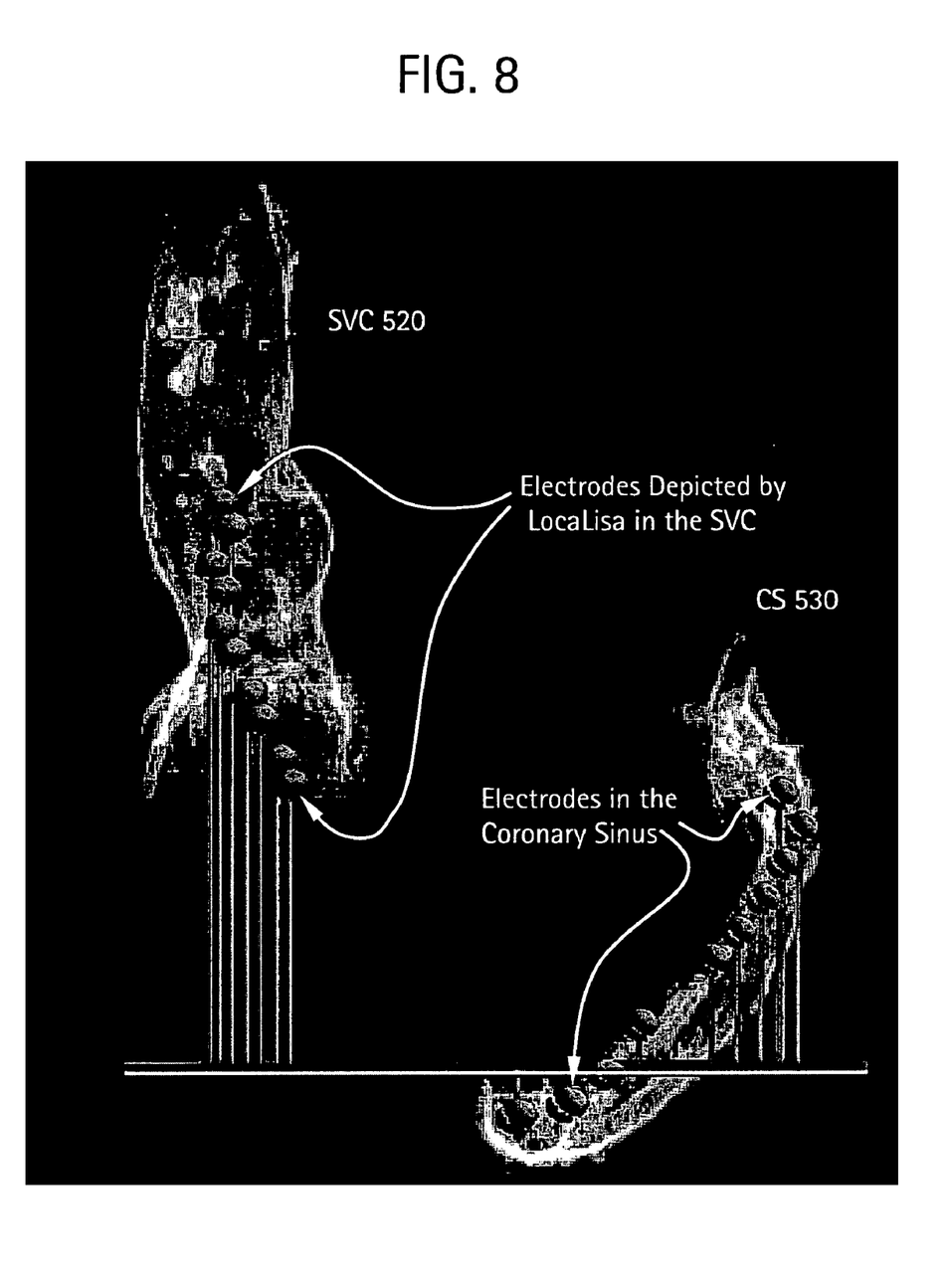
FIG. 8 depicts the location of catheter electrodes by a LocaLisa™ interventional system.

As shown in FIG. 7, the electrodes of the coronary sinus catheter 510 are depicted on the fluoroscopy system as shown in the left panel. As shown in FIG. 2 (block 324) and in FIG. 1, the image 184 (in addition to the 3D model) is processed to establish the path of the catheter 510 in the vessels of interest such as the SVC 520 and coronary sinus 530. The images 184, 520 and 530 are processed for image refinement using known techniques for adjusting the intensity of the voxels within the coronary sinus for images from the arterial phase data acquisition, or using known techniques for adjusting image brightness in accordance with the arterial or venous phase study. Using this contrast enhanced segmentation analysis, the SVC 520, and the coronary sinus 530 are identified as depicted in the right panel of FIG. 7. The electrodes of the coronary sinus can also be shown and marked on the interventional system. The catheter (electrodes) is then aligned with the exported segmented superior vena cava 520 and coronary sinus 530 images and the left atrial model 184 using a transformation process as depicted in the right panel. As there is a fixed relationship between the left atrium and these structures, the left atrial model can also be visualized subsequently on the interventional system. FIG. 8, as an example, shows the electrodes on the coronary sinus catheter marked with the LocaLisa™ system and aligned with the SVC and the coronary sinus.

In the case of bi ventricular pacing the right ventricular lead 540 is usually placed first. This follows the path of coronary sinus catheter in the SVC 520 but instead of going to the coronary sinus is placed in the right ventricle. An example of right ventricle lead placed in the right ventricle is depicted in FIG. 6. The SVC 520 and the coronary sinus image 530 are then aligned with the lead 540 by identifying the transformation to link these images. The whole of the left ventricle along with the coronary sinus can also be segmented and depicted as shown in FIG. 4. As particularly detailed in U.S. application Ser. Nos. 10/605,903 and 10/900,847 (incorporated herein by reference in their entirety), the most optimal site for pacing on the left ventricle can be identified on these registered images and the pacing lead placed in the nearest coronary sinus branch or epicardially from outside to achieve maximum benefit. In addition to left ventricular registration or bi ventricular pacing, a catheter placed retrogradely in the ventricle through the aorta and aligned with the aorta and/or multiple fiducial points placed in the aorta and or the left ventricle can be used for registration as well.

As disclosed, some embodiments of the invention may include some of the following advantages: the availability of a CT-interventional system registration technique that will allow pacing leads to be navigated and placed at the most appropriate site, thereby improving the effectiveness of bi-ventricular or left ventricle pacing; the availability of a CT-interventional system registration technique that will show the location of the coronary sinus on the 3D model, thereby eliminating the need in bi-ventricular pacing to perform coronary sinus angiography prior to implantation of the coronary sinus lead; the ability to merge the information obtained from a 3D model generated using a scanner with the real-time live information provided by the interventional system; and, the availability of a technique that will allow visualization of the true 3D geometry of the different pulmonary vein-left atrial junction and other strategic areas in the atria by using imaging capabilities of the CT, and more importantly registering these images with the interventional system, to help isolate the pulmonary veins and other areas which initiate and sustain AF more precisely and easily.

While embodiments of the invention disclose a heart as an exemplary anatomical region, it will be appreciated that the invention is not so limited and that the scope of the invention includes other anatomical regions of interest within the patient. While embodiments of the invention disclose a coronary sinus, SVC and left atrium as an exemplary anatomical structure within an anatomical region, it will be appreciated that the invention is not so limited and that the scope of the invention includes other anatomical structures within an anatomical region. While embodiments of the invention disclose a catheter or a lead placed within the patient, it will be appreciated that the invention is not so limited and that the scope of the invention includes other devices.

An embodiment of the invention may be embodied in the form of computer-implemented processes and apparatuses for practicing those processes. The present invention may also be embodied in the form of a computer program product having computer program code containing instructions embodied in tangible media, such as floppy diskettes, CD-ROMs, hard drives, USB (universal serial bus) drives, or any other computer readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. The technical effect of the executable instructions is to register a 3D model with an interventional system for at least the purpose of assisting in a medical intervention procedure.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for registration of a 3D anatomical model in an interventional system, the method comprising:
   receiving said 3D anatomical model with a first plurality of fiducial points thereon at said interventional system, said interventional system farther having an interventional system model with a second plurality of fiducial points thereon;
   calibrating said second plurality of fiducial points of said interventional system model to a predetermined cardiac cycle and a predetermined respiratory cycle associated with the said first plurality of fiducial points on said 3D anatomical model;
   scaling a size of said 3D anatomical model with respect to a size of said interventional system model, and rotating and translating said 3D anatomical model such that each point of said first plurality of fiducial points on said 3D anatomical model are aligned with a corresponding point of said second plurality of fiducial points so as to register said 3D anatomical model with said interventional system model; and
   displaying said 3D anatomical model and said interventional system model on a display device.

2. The method of claim 1, further comprising determining a transformation, T, between said first plurality of fiducial points, x, in a first coordinate space with said second plurality of fiducial points, y, in a second coordinate space so as to minimize an error T(x)-y.

3. A system for registration of a 3D anatomical model comprising:
an imaging system for acquiring said 3D anatomical model said 3D anatomical model having a first plurality of fiducial points thereon;
an interventional system configured to receive said 3D anatomical model from said imaging system, with said first plurality of fiducial points thereon said interventional system further having an interventional system model with a second plurality of fiducial points thereon;
said interventional system further configured to calibrate said second plurality of fiducial points of said interventional system model to a predetermined cardiac cycle and a predetermined respiratory cycle associated with the said first plurality of fiducial points on said 3D anatomical model;
said interventional system further configured to scale a size of said 3D anatomical model with respect to a size of said interventional system model, and to rotate and translate said 3D anatomical model such that each point of said first plurality of fiducial points on said 3D anatomical model are aligned with a corresponding point of said second plurality of fiducial points so as to register said 3D anatomical model with said interventional system; and
said interventional system further configured to display said 3D anatomical model and said interventional system model on a display device.

4. The system of claim 3, further comprising means for determining a transformation, T, between said first plurality of fiducial points, x, in a first coordinate space with said second plurality of fiducial points, y, in a second coordinate space so as to minimize an error T(x)-y.

5. A method for registration of a 3D anatomical model in an interventional system, the method comprising: said receiving a 3D anatomical model an at said interventional system, said 3D anatomical model having one or more anatomical features thereon;
navigating an instrument to locations corresponding to said one or more anatomical features on said 3D anatomical image using said interventional system;
determining locations of said instrument on an interventional system model when said instrument is at said locations corresponding to said one or more anatomical features;
scaling a size of said 3D anatomical model with respect to a size of said interventional system model, and rotating and translating said 3D anatomical model such that locations of said anatomical features in said 3D anatomical model are aligned with locations of said instrument in said interventional system model 3D anatomical model with said interventional system model; and
displaying said 3D anatomical model and said interventional system model on a display device.

6. The method of claim 5, further her comprising calibrating said locations of said instrument on said interventional system model to a predetermined cardiac cycle and a predetermined respiratory cycle associated with the said anatomical features on said 3D anatomical model.

7. The method of claim 5, further comprising determining a transformation, T, between said one or more anatomical features in a first coordinate space with instrument locations in a second coordinate space so as to link said one or more anatomical features with said instrument locations and minimize a registration error.

8. A system for registration of a 3D anatomical model comprising:
an imaging system for acquiring said 3D anatomical model, said 3D anatomical model having one or more anatomical features thereon;
an interventional system configured to receive said 3D anatomical model from said imaging system;
said interventional system configured to navigate for navigating and localizing an instrument to locations corresponding to said one or more anatomical features on said 3D anatomical model; and
said interventional system further configured to determine locations of said instrument on an interventional system model when said instrument is at said locations corresponding to said one or more anatomical features;
said interventional system further configured to scale a size of said 3D anatomical model with respect to a size of said interventional system model, and to rotate and translate said 3D anatomical model such that locations of said anatomical features in said 3D anatomical model are aligned with locations of said instrument in said interventional system model so as to register said 3D anatomical model with said interventional system model; and
said interventional system further configured to display said 3D anatomical model and said interventional system model on a display device.

9. The system of claim 8, wherein said interventional system is further configured to calibrate said locations of said instrument on said interventional system model to a predetermined cardiac cycle and a predetermined respiratory cycle associated with the said anatomical features on said 3D anatomical model.

10. The system of claim 8, wherein said interventional system is further configured to determine a transformation, T, between said one or more anatomical features in a first coordinate space with the instrument locations in a second coordinate space so as to link said one or more anatomical features with said localized instrument locations and minimize a registration error.

* * * * *